United States Patent [19]
Eastes

[11] 3,916,076
[45] *Oct. 28, 1975

[54] RUPTURABLE POLYSTYRENE LAYERED ARTICLE

[75] Inventor: Frank E. Eastes, Spartanburg, S.C.

[73] Assignee: W. R. Grace & Co., Duncan, S.C.

[ * ] Notice: The portion of the term of this patent subsequent to Feb. 12, 1991, has been disclaimed.

[22] Filed: Nov. 5, 1973

[21] Appl. No.: 412,861

Related U.S. Application Data

[62] Division of Ser. No. 205,394, Dec. 6, 1971, Pat. No. 3,791,916.

[52] U.S. Cl. ............... 428/516; 427/385; 156/327; 156/306; 428/500; 428/411; 53/39; 206/46 R; 206/63.2 R; 206/56 AA; 229/3.5 R; 229/43; 229/48 J
[51] Int. Cl.² .......................................... B32B 27/06
[58] Field of Search............ 215/1 C; 161/252, 247; 260/235, 31.2 R, 31.6, 31 A, 31 R, 31.8 PQ, 31.8 HR; 117/138.8 UA, 122 P, 161 UZ; 156/327

[56] References Cited
UNITED STATES PATENTS

| | | | |
|---|---|---|---|
| 2,965,589 | 12/1960 | Price................................. | 260/23 S |
| 3,393,081 | 7/1968 | Bogle............................. | 117/122 H |
| 3,402,219 | 9/1968 | Hill et al........................... | 260/23 S |
| 3,449,277 | 6/1969 | Smith et al. ...................... | 260/23 S |
| 3,481,818 | 12/1969 | Wellen........................... | 161/252 X |
| 3,502,540 | 3/1970 | Pietrocola....................... | 161/252 X |
| 3,654,069 | 4/1972 | Freudenberg................... | 161/252 X |
| 3,677,874 | 7/1972 | Sterrett et al.................... | 161/252 X |
| 3,789,028 | 1/1974 | Heiskel et al.................. | 260/23 S X |
| 3,791,916 | 2/1974 | Eastes................................ | 161/247 |

*Primary Examiner*—William J. Van Balen
*Assistant Examiner*—Patricia C. Ives
*Attorney, Agent, or Firm*—John J. Toney; Richard G. Jackson; William D. Lee, Jr.

[57] ABSTRACT

Two polystyrene surfaces may be sealed together with a fusion type seal at a temperature below the melting point or distortion temperatures of the polystyrene by coating the polystyrene with a selected material that causes the polystyrene to seal in such a manner at a temperature between room temperature and the melting temperature of the polystyrene. A new article is formed having two layers of polystyrene separated by a layer of polystyrene with a selected material dispersed therein. In some species the medial layer is stronger than the adjacent polystyrene layers and in others, the seals will open along the seal line when opening stress is applied to the article.

3 Claims, No Drawings

RUPTURABLE POLYSTYRENE LAYERED ARTICLE

This is a division of application Ser. No. 205,394, filed Dec. 6, 1971, now U.S. Pat. No. 3,791,916.

BACKGROUND OF THE INVENTION

This invention relates to a method of sealing polystyrene surfaces together and to the articles formed thereby. More specifically, this invention relates to sealing polystyrene surfaces together at a temperature below the melting point, distortion temperature or in the case of oriented polystyrene, the shrink temperature of the polystyrene.

In the past, attempts to find a satisfactory cover for polystyrene trays, and the like, have met with difficulties. Non-polystyrene-sheet materials have been used, but these have the disadvantage of greater cost, less clarity and lack of sufficient rigidity. Polystyrene sheet has been employed, but it is necessary to raise the temperature to the melting point in order to obtain a satisfactory seal between the two polystyrene surfaces. This results in a distortion of the polystyrene tray as well as the cover sheet. This problem is much more acute when an oriented polystyrene tray and cover is employed because the distortion is much greater with shrinking occurring before the melting point is reached. Generally, polystyrene trays are formed from oriented sheet because of its greater strength and clarity.

As shown in U.S. Pat. No. 3,393,081, coating materials have been employed on polystyrene to enable it to be sealed to itself. U.S. Pat. No. 3,393,081 discloses the use of an aliphatic saturated monocarboxylic fatty acid of a particular chemical structure as a polystyrene sealing aid. The material of that patent is stated at column 2, line 59 et seq., to have good polystyrene solubility and to provide heat activated solvent seals.

By the invention of this application a number of suitable heat sealing aids for polystyrene have been discovered that are not related to any materials previously used. The materials I have discovered are not normally classified as polystyrene solvents or suitable for equivalent uses. In fact, curiously these materials are not, in many cases, closely related to one another. This is not to say the materials are not operating through some solvent type mechanism at the elevated temperatures.

It is an object of this invention to provide a method for heat sealing polystyrene together employing a selection of materials providing a flexiblity of operation under varying conditions.

It is a further object of this invention to provide new polystyrene articles having varying properties for use in a wide variety of situations.

SUMMARY OF THE INVENTION

By an aspect of the invention, a method is provided for sealing a polystyrene surface area to another polystyrene surface area. The method includes coating at least one of the polystyrene surface areas with a material selected from the group consisting of phthalic acid diester ($C_4$–$C_{26}$), citric acid triester, glyceryl triester, propylene glycol and polyethylene glycol fatty acid esters, ethoxylated fatty alcohol, butyl diester, adipic acid diester, aryl phosphate, fatty alcohol and mixtures thereof. The coated surface area is brought into interfacing engagement with another polystyrene surface and the surface areas are heated at the interface and sealed together. The sealed polystyrene surface areas are thereafter cooled to firm the seal.

In one specie of my invention, the material is selected from the group consisting of phthalic acid diester ($C_4$–$C_{26}$), citric acid triester glyceryl triester, propylene glycol fatty acid monoester, polyethylene glycol fatty acid diester, more than 60% acetylated acetoglyceride and mixtures thereof, and the surface areas including the seal are provided greater strength integrity than adjacent areas.

In another specie of my invention, the material is selected from the group consisting of ethoxylated fatty alcohol, citric acid triester, polyethylene glycol fatty acid monoester, less than 60% acetylated acetoglyceride and mixtures thereof, and the seal is provided less strength integrity than adjacent areas whereby the seal will rupture under stress in preference to the adjacent areas.

In yet another specie of my invention, the material is selected from the group consisting of butyl diester, adipic acid diester, aryl phosphate, phthalic acid diester ($C_1$–$C_3$) and mixtures thereof. The coating is applied and instead of leaving a non-tacky surface area, as is the case with the previous two described species, it produces a tacky surface area. In this specie, the surface areas are held together by the tackiness upon being brought into interfacing engagement prior to heating whereby the surface areas are held in relative position one to the other prior to heat sealing. In this specie, the strength integrity of the seal is less than the adjacent areas as was the case with the last discussed specie.

By an additional aspect of this invention, an article is provided comprising two layers (or an upper and a lower portion) of polystyrene separated by a layer (or intermediate portion) of polystyrene with a material dispersed therein selected from the group consisting of phthalic acid diester ($C_4$–$C_{26}$), citric acid triester, glyceryl triester, propylene glycol and polyethylene glycol fatty acid esters, ethoxylated fatty alcohol, butyl diester, adipic acid diester, aryl phosphate, fatty alcohol and mixtures thereof.

In one specie of my article, the material dispersed in the polystyrene layer (or intermediate portion) is selected from phthalic acid diester ($C_4$–$C_{26}$), citric acid triester, glyceryl triester, propylene glycol fatty acid monoester, polyethylene glycol fatty acid diester, more than 60% acetylated acetoglyceride and mixtures thereof, and the polystyrene layer (or portion) with the material dispersed therein has greater strength integrity than the two polystyrene layers (or separated upper and lower portions).

In another specie of my article, the material dispersed in the polystyrene layer (or intermediate portion) is selected from less than 60% acetylated acetoglyceride, ethoxylated fatty alcohol, citric acid triester, polyethylene glycol fatty acid monoester, butyl diesters, adipic acid diester, aryl phosphate, phthalic acid diester ($C_1$–$C_3$) and mixtures thereof, and the polystyrene layer (or portion) with the material dispersed therein has less strength integrity than the two adjacent polystyrene layers (or separated portions) whereby the article will rupture within the polystyrene layer (or intermediate portion) with the material dispersed therein in preference to rupturing in the two layers (or portions) of polystyrene when the article is under stress.

DESCRIPTION OF THE PREFERRED EMBODIMENTS

Broadly speaking, the present invention is based on the discovery that a number of materials, as listed in Table I, many of which appear to have little relation, provide unexpected properties of heat sealability between polystyrene surfaces when one or both of the surfaces is coated with the material. Even more surprising is the fact that intervening materials which would appear to be more closely related to various ones of the materials than the materials are to one another, have no heat sealing effect whatsoever. Thus, as is shown in Tables I and II, inexplicably certain materials worked and other similar materials do not work. It is equally surprising that one would not have anticipated that the materials of this invention would function to lower the heat sealing temperature required to heat seal polystyrene to itself. The surprise was not in finding the materials that did not work, for that was anticipated, but instead, in finding the strange collection of materials that do not seem to have a logical thread enabling one to predict ahead of time that they would be likely to work. The materials listed were all in their ordinary commercial form, which is a liquid form in most instances. However, a few were of rather high viscosity and waxy.

The primary invention is the provision of a group of materials that have many different properties distinguishing them from one another and yet all of which will cause two polystyrene surfaces to form a heat seal at a temperature above room temperature and the melting point of the polystyrene. What is even better is that these materials will perform their sealing function below the distortion temperature of polystyrene and even below the distortion or shrink temperature of the normal commercial oriented polystyrene which is about 280°F. at its upper limit. The general distortion temperature or effective distortion temperature is much lower if the heat is applied for only a short time. Distortion can occur at 220°F. in oriented sheet if the heat is applied for about 10 minutes.

The materials of Table I are all operable between the heat sealing temperature of 150° and 290°F. and also within the preferred heat sealing temperature range of 150°–275°F. and the more preferred heat sealing temperature of 220°–260°F., which is best commercially on high output equipment. The operability at the heat sealing temperature of 220° to 260°F. enables seals to be formed in from 5–15 seconds with heated bar type sealers operating at pressures of about 80–90 p.s.i. as is usual on many pieces of commercial equipment. In order to assure good seals, the surfaces to be sealed should always be firmly pressed together during the time the heat is applied. Heat sealing times are usually maintained within a time period of 0.5 second to 2 minutes, more preferably 2 seconds to 1 minute and most preferably 5 seconds to 15 seconds in order to obtain good heating of the seal area in the shortest time possible and also to avoid distortion at temperatures 220°F. and above.

The seals are all what I classify as a fusion seal. This is because the seal appears to be directly through the heat sealing of the polystyrene at the reduced temperature rather than through any adhesive action of any of the coating materials. Each of the coating materials also appears to disperse generally into the surface areas of the polystyrene when the surrounded polystyrene surfaces are heated with the coating, rather than being driven off as is the case with solvent seals.

In this way an entirely new article is produced. The article has two polystyrene layers separated by a layer of polystyrene with the coating material dispersed therein.

Of great benefit is the fact that the group of materials of my invention, because of their diversity, have different volatilities, different levels of toxicity (many being food grade), different price levels (which may fluctuate with time to make one more desirable today and another tomorrow), etc. My invention also has great flexiblity in its ability to provide different seal area properties both at the time the seal is formed (tackiness for holding the surfaces in present relationship) and after sealing so a cover may be removed intact or so the seal will be stronger than the adjacent polystyrene.

Thus by my invention, a group of materials is provided that are not tacky at room temperature so that they may be applied to the polystyrene surface an any time. In this way articles may be pre-treated and heat sealed at a later time. Then depending upon how the article is to be utilized, it may be desirable that the heat seal between the two polystyrene surfaces be stronger than the adjacent surface to assure that the seal will be permanent. In this latter instance, the preferred group of materials would be that identified as (A) in Table I. The usually preferred members of this group are those of Runs 2, 3, 6 and 9 because there is no haze associated with the use of these materials when clear polystyrene is being employed as shown in Table II.

In this manner an article is provided that has a seal that is very strong and not subject to parting along the seal line.

In other applications, it may be desired that the polystyrene seal part along the seal line so that, for example, a top may be removed from a tray without the danger of tearing the tray itself or damaging the top. In this instance, the materials of Group (B) in Table I are used. In this group the materials of Runs 14 and 16 are preferred when used with clear polystyrene because of their lack of haze as shown in Table II.

In some instances, it may be desired to employ a coating that will exhibit substantial tack so that when a polystyrene surface is engaged with the polystyrene surface to which it is to be joined, it will stick temporarily. This can simplify equipment used for applying covers to trays in many instances by eliminating the need for means to retain the cover in position prior to heat sealing. In this instance, the materials of Group (C) of Table I are used. Unfortunately, I have been unable to discover any materials that have the "tacky" property that give seals having greater integrity than the surrounding polystyrene. None of the materials of Group (C) exhibited a hazy condition as may be seen in Table II.

These latter two discussed groups of materials provide an article that may be broken along the seal line.

Some materials have also been discovered that provide especially weak seals that may have special uses. These are the materials of Group (D). They provide articles having very easily opened seal lines. Only a very slight pull is necessary to separate these articles at the seal line.

From the foregoing, it may be seen that in truth several entirely different aspects of my invention exist which enable a very versatile selection and tailoring of polystyrene to polystyrene seals all at tempertures that will not melt the polystyrene, distort the polystyrene or in the case of oriented polystyrene, shrink the polystyrene. Polystyrene normally has a melting temperature of about 300°F. Even unoriented polystyrene will distort at a temperature significantly below this melting temperature, for example, as low as about 280°F. when the heat is applied for a short period of time, a few seconds, and 220°F. if the heat is applied for about 10 minutes or longer.

In preferred applications, my invention is applied to polystyrene food packaging trays in which strength is important. The trays may be thermoformed by any of the known methods from oriented polystyrene sheet. The tray is filled with food and thereafter covered with an oriented polystyrene sheet. Oriented polystyrene is considerably stronger than unoriented polystyrene. Typically, the polystyrene sheets are clear and biaxially oriented at least about 2 to 1 in each direction. The sheet can, of course, be either cold drawn or hot drawn. A typical gauge for such sheets is about 7 mils. Obviously, the invention can be applied equally to thin polystyrene film or to thicker gauge sheets and articles.

The coating may be applied to the polystyrene surface in any manner such as wiping with a saturated felt, or by rotogravure, trailing blade, etc. The coating should preferably be so thin as to be invisible on casual examination—only enough to evenly cover the surface. Usually the thinner the coating the better so long as the surface is adequately covered from a completeness of coverage standpoint. The materials may be applied in 100% concentrations as in the Examples of this application or in solution or in any other appropriately available form.

In the usual instance, any heat sealing device may be used, including automatic mechanical packaging equipment and hand held sealing bars.

Several of the terms in the table need special discussion. By acetoglyceride is meant glyceryl fatty acid ester with about one-half or more of the hydroxyl groups acetylated. The group of these materials given in Group (A) of the Table has substantially all of the hydroxyl groups acetylated while those in Group (B) have only about half of the hydroxyl groups acetylated. These are referred to in the Table as fully acetylated acetoglyceride and one-half acetylated acetoglyceride, respectively. It is intended in the generic sense to cover the entire spectrum of acetoglycerides.

Phthalic acid diesters form good seals of the category (B) class but the longer chain radicals ($C_4+$) form non-tacky coatings while the short chain radicals ($C_1$–$C_3$) form tacky coatings.

Propylene glycol and polyethylene glycol fatty acid esters form seals having greater strength integrity than the surrounding polystyrene of the category (A) class (Table I), good seals of the category (B) class that will open at the seal line and weak seals of the category (D) class that are not strong enough for most uses. Propylene glycol fatty acid monoester and polyethylene glycol fatty acid diester gave the strongest seals obtained in category (A). Polyethylene glycol fatty acid monoester gave a seal of the category (B) class and polypropylene glycol fatty acid diester gives a weak seal of category (D) class.

While the claims call for named materials "from the group consisting of," it is obvious that small amounts of impurities and additives and the like that do not interfere with the basic character of the named materials are not intended to remove the materials from the scope of protection.

The following examples further illustrate the nature and advantages of the present invention.

EXAMPLE I

The rim of a polystyrene tray of one gallon capacity available through the Formpac Division of W. R. Grace & Co. was wiped with a piece of felt saturated with the triacetin of Run 3, Table I which was 100% concentration. The tray was formed of 7.5 mil, oriented polystyrene sheet. Thereafter, the tray was filled with freshly cut grapefruit sections. After this a 7.5 mil clear, oriented polystyrene sheet having biaxial orientation of about 2 to 1 in each direction was placed over the tray as a cover. The sheet of material is also available through the Formpac Division of W. R. Grace & Co. The cover was heat sealed to the tray with a bar type heat sealer using 90 lbs. per square inch pressure and a temperature of 250°F. for 3 seconds. The seal was clear and exceedingly strong. The seal strength was the same as that shown in Run 3.

The sealer was of the type that had a support die that fit under the rim of the oriented polystyrene tray so that when the heated bar portion of the mating sealing member was brought down, it trapped the oriented polystyrene cover against the oriented polystyrene tray rim and pressed the oriented polystyrene together about the rim.

EXAMPLE II

A check was run on an untreated oriented polystyrene tray of the type described above with an uncoated oriented polystyrene cover. In all other respects, except the lack of a coating on the tray rim, the procedure was the same. There was no evidence of sealing of the lid to the tray and when the tray was removed from the sealer, the lid fell off.

EXAMPLE III

In Example III runs were made to test different possible coating materials described in Table I. Four-by-four inch sheets of 7.5 mils thick polystyrene were used. The sheets were biaxially oriented about 2 to 1 in each direction and available from the Formpac Division of W. R. Grace & Co. One surface of a sheet was wiped with a felt leaving a thin film of the coating material thereon. If the film was so thick as to be clearly visible on casual examination, the excess was wiped off with a towel. The results for each run listed in Table I is given in Table II.

The heat sealing was carried out with a hand-operated heat sealing bar about 1¼ inches wide and 3 to 4 inches long with hand pressure. The bar temperature was maintained between 210°–230°F. In no case was any shrink distortion or melting observed. The sealing time was about 30 seconds after which the sheets were cooled and examined to determine haze and the tightness of the seal. The strength of the seal was determined by grasping the unsealed edges of the sheets and pulling. When the seals are listed as "strong" or "excellent" the surface areas including the seal had greater strength integrity than the adjacent areas and the sheet tore. When the seal strength is listed as "fair" to "good" the seals separated along the seal line upon a substantial pull being applied. When the seal strength is listed as "weak" it would be unsatisfactory for most uses. Only a slight amount of pulling force was needed.

Tackiness was determined by touching the surfaces of polystyrene together and visually observing how they stuck together prior to applying the heat.

Clarity was determined visually and is based upon whether the clear polystyrene sheet appeared less clear in the area of the seal than when the two sheets were just pressed together uncoated.

Table I

LIST OF MATERIAL

| Group or Category | Run | Generic Material | Specific Material | Source | Material's Normal Uses |
|---|---|---|---|---|---|
|   | 1 | phthalic acid diester ($C_1$-$C_{26}$) | dioctyl phthalate | Allied Chemical Co. | plasticizer for vinyl polymers |
|   | 2 | citric acid triester | acetyltri-2-ethylhexyl | Charles Pfizer & Co., Inc. Citroflex A-8 | do |
|   | 3 | glyceryl triester | glyceryl triacetate (triacetin) | Eastman Chemical Products, Inc. | solvent and a special plasticizer for cellulose acetate and nitrate compositions |
| A | 4 | propylene glycol fatty acid monoester | propylene glycol monolaurate | Wilson-Martin, Div. of Wilson & Co., Inc. - E-2580 | surfactant |
|   | 5 | polyethylene glycol fatty acid diester | polyethylene glycol dilaurate | Kessler Chemical Co. - Polyethylene glycol Delaurate 200 | do |
|   | 6 | more than 60% acetylated acetoglyceride | fully acetylated acetoglyceride ($C_{14}$-$C_{20}$) | Wilson-Martin, Div. of Wilson & Co., Inc. - Acetoglyceride - 72T (Food Grade) | food coating, emulsifier, lubricant, antifoam agent |
|   | 7 | do | do | do but 65T | do |
|   | 8 | do | do | do but 12T | do |
|   | 9 | do | do | do but 55T | do |
|   | 10 | less than 60% acetylated acetoglyceride | ½ acetylated acetoglyceride ($C_{14}$-$C_{20}$) | do but acetoglycerol - 55H | do |
|   | 11 | do | do | do but 72H | do |
|   | 12 | do | do | do but 65H | do |
| B | 13 | ethoxylated fatty alcohol | ($C_{12}$-$C_{16}$) lauryl alcohol ethoxylated with 3 moles of ethylene oxide commercial (technical grade) Dusseldorf-Dehydol | Henkel International GMBH Dusseldorf-Dehydol LT-3 | surfactant |
|   | 14 | citric acid triester | acetyltributyl citrate | Charles Pfizer & Co., Inc. Citroflex A-4 | plasticizer for vinyls and cellulosics |
|   | 15 | polyethylene glycol fatty acid monoester | polyethylene glycol monooleate | Kessler Chemical Co. - Polyethylene Glycol 400 Monooliate | surfactant |
|   | 16 |   | acelyltriethyl citrate | Charles Pfizer & Co. | plasticizer for cellulosics |
| C | 17 | butyl diesters | dibutyl sebacate | Dewey & Almy Div., W. R. Grace & Co. | plasticizer for vinyl resins |
|   | 18 | adipic acid diester | diisobutyl adipate | do | do |
| C | 19 | aryl phosphate | alkyl aryl phosphate | Monsanto Chemical Co. - Santizer-141 | plasticizer for vinyl resins |
|   | 20 | phthalic acid diester ($C_1$-$C_3$) | dimethyl phthalate | Fisher Scientific Co. | plasticizer for cellulose acetate |
| D | 21 | fatty alcohol | stearyl alcohol 1-octadecanol | do | slip and release agent |
|   | 22 | polypropylene glycol fatty acid diester | propylene glycol laurate | C. P. Hall Co. - CPH-5E | surfactant |
|   | 23 | fatty acid - glycol ester | glycerol mannitan laurate | Allan Power Co. NNO | surfactant |
|   | 24 | fatty acid - fatty alcohol ester | hexadecyl stearate | Wilson-Martin, Div. of Wilson & Co. Inc. | cosmetics |
|   | 25 | fatty acid | stearic acid ester grade | Fisher Scientific Co. |   |
|   | 26 | polyglycerol fatty acid ester | propylene glycol glyceryl oleate | C. P. Hall Co. - CPH-3 | surfactant |
|   | 27 | do | deglycerol monostearate | do but 72 | do |
|   | 28 | do | triglycerol monooleate | do | do |
|   | 29 | do | diglycerol monooleate | do | do |
|   | 30 | fatty acid ester of polyhydric alcohol | glyceryl monostearate | do but 72 | slip, release and antistatic agent for plastic films |
|   | 31 | do | sorbitan monooleate | Atlas Chemical Ind. Span 80 | surfactant |
|   | 32 | do | sorbitan monostearate | do but Span 60 | do |
|   | 33 | do | sorbitan monopalmetate | do but Span 40 | do |
|   | 34 | ethoxylated fatty acid ester of polyhydric alcohol | polyoxyethylene sorbitan | do but Tween 20 | do |
|   | 35 | do | polyoxyethylene sorbitan monopalmetate | do but Tween 40 | do |
|   | 36 | do | polysorbate 60 | do but Tween 60 | do |
|   | 37 | propylene glycol - propylene oxide - ethylene oxide condinsate |   | Wyandotte Chemical Corp. pluronic L64 | do |
|   | 38 | do |   | do but F68 | do |
|   | 39 | fatty amide | oleylamide | Armone Industries Chemical Co. Armoslip OW | slip and anti blocking agent for polymer films and coatings |
|   | 40 | do | amide E (beheamide) | Humko Chemical Div. of | do |

Table I-continued

LIST OF MATERIAL

| Group or Category | Run | Generic Material | Specific Material | Source | Material's Normal Uses |
|---|---|---|---|---|---|
| | 41 | polyethylene glycol | | National Drug Products Corp. Kemstrene Whitestone Chemical Corp. PEG 6000 Flake | surfactant |
| | 42 | do | | Olin Mathison Chemical Corp. Polyethylene Glycol - 400 | do |
| | 43 | sulfonated castor oil | sodium salt of sulfated caster oil | Swift & Co. | do |

Table II

RESULTS

| Group or Category | Run | Tacky at about 70°F. | Seal Strength None | Weak | Fair | Good | Strong | Excellent | Clarity Clear | Hazy |
|---|---|---|---|---|---|---|---|---|---|---|
| A | 1 | no | | | | | x | | | some |
| A | 2 | no | | | | | x | | x | |
| A | 3 | no | | | | | x | | x | |
| A | 4 | no | | | | | | x | | some |
| A | 5 | no | | | | | | x | | slight |
| A | 6 | no | | | | | x | | x | |
| A | 7 | no | | | | | x | | | yes |
| A | 8 | no | | | | | x | | x | yes |
| A | 9 | no | | | | | x | | | |
| B | 10 | no | | | | x | | | | very |
| B | 11 | no | | x | | | | | | very |
| B | 12 | no | | x | | | | | | very |
| B | 13 | no | | | | x | | | | slight |
| B | 14 | no | | x | | | | | x | |
| B | 15 | no | | x | | | | | | yes |
| B | 16 | no | | | | x | | | x | |
| C | 17 | very | | | | x | | | x | |
| C | 18 | very | | | | x | | | x | |
| C | 19 | slight | | | | x | | | x | |
| C | 20 | slight | | | | x | | | x | |
| D | 21 | no | | x | | | | | | |
| D | 22 | no | | x | | | | | | yes |
| | 23 | no | x | | | | | | | |
| | 24 | no | x | | | | | | | |
| | 25 | no | x | | | | | | | |
| | 26 | no | x | | | | | | | |
| | 27 | no | x | | | | | | | |
| | 28 | no | x | | | | | | | |
| | 29 | no | x | | | | | | | |
| | 30 | no | x | | | | | | | |
| | 31 | no | x | | | | | | | |
| | 32 | no | x | | | | | | | |
| | 33 | no | x | | | | | | | |
| | 34 | no | x | | | | | | | |
| | 35 | no | x | | | | | | | |
| | 36 | no | x | | | | | | | |
| | 37 | no | x | | | | | | | |
| | 38 | no | x | | | | | | | |
| | 39 | no | x | | | | | | | |
| | 40 | no | x | | | | | | | |
| | 41 | no | x | | | | | | | |
| | 42 | no | x | | | | | | | |
| | 43 | no | x | | | | | | | |

I claim:

1. A preferentially rupturable article comprising a first polystyrene layer, a second polystyrene layer, and a fusion seal joining said first and second layers, said fusion seal being a third layer disposed intermediate said first and second layers and consisting essentially of polystyrene and a material dispersed therein, said material being selected from the group consisting of ($C_{12}$ to $C_{16}$) lauryl alcohol ethoxylated with ethylene oxide, acetyl tributyl citrate, acetyl triethyl citrate, polyethylene glycol monooleate, dibutyl sebacate, diisobutyl adipate, alkyl aryl phosphate, ½ acetylated acetoglyceride, and mixtures thereof, said third layer having less strength integrity than said first and second layers whereby said article will rupture within the third layer in preference to rupturing in said first and second layers when the article is under stress.

2. The article of claim 1 wherein the material is acetyl tributyl citrate.

3. The article of claim 1 wherein the material is acetyl triethyl citrate.

* * * * *